April 29, 1924.
J. J. MEYER
INSERTABLE JOINT
Filed June 25, 1921
1,492,520
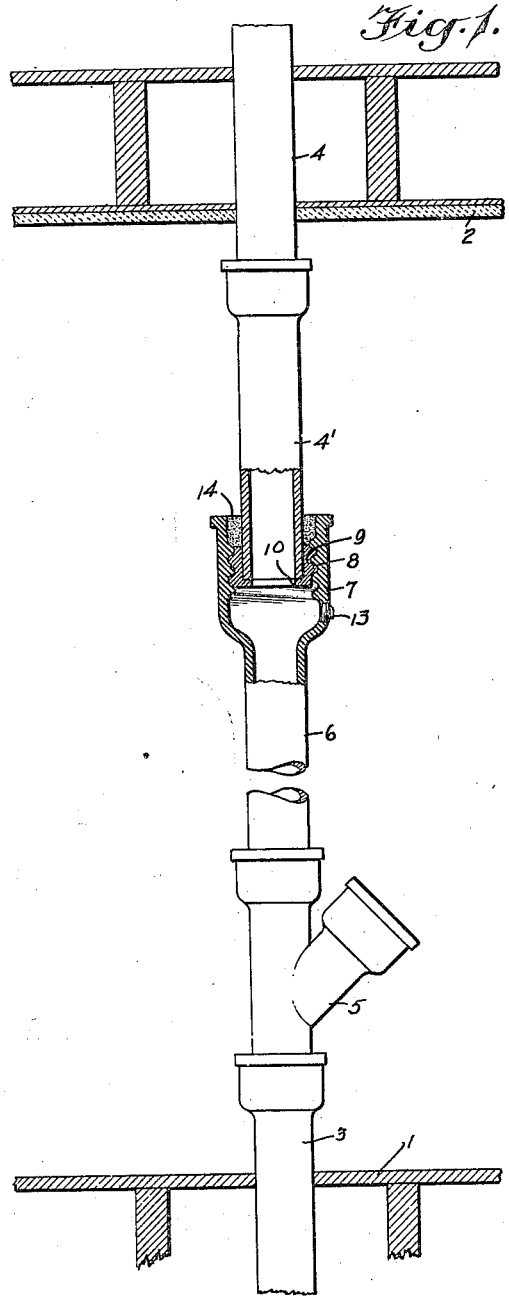
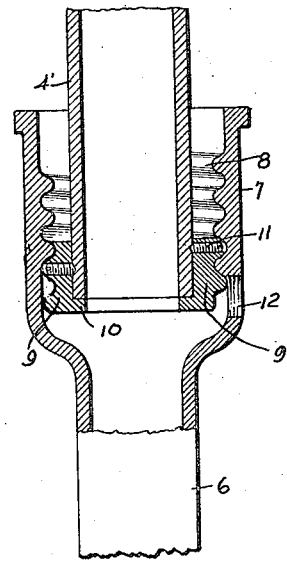
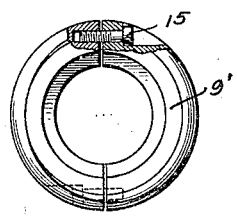
WITNESSES
INVENTOR
JOHN J. MEYER
BY
ATTORNEYS Patented Apr. 29, 1924.

1,492,520

UNITED STATES PATENT OFFICE.

JOHN J. MEYER, OF NEW YORK, N. Y.

INSERTABLE JOINT.

Application filed June 25, 1921. Serial No. 480,295.

*To all whom it may concern:*

Be it known that I, JOHN J. MEYER, a citizen of the United States, and a resident of the city of New York, borough of Manhattan, in the county and State of New York, have invented a new and Improved Insertable Joint, of which the following is a full, clear, and exact description.

This invention relates to plumbing and particularly to an improved insertable joint and has for an object to provide a construction wherein a neat repair job may be made at a minimum expense.

Another object in view is to provide a joint for soil or waste pipes which will necessitate the use of only one special joint or connecting member.

A still further object of the invention, more specifically, is to provide a joint which may be readily inserted into a soil pipe and then adjusted in such a manner as to present a proper support for the upper sections of pipe and at the same time present a hub which may be properly packed in the ordinary manner.

In the accompanying drawing—

Figure 1 is a side view of part of a soil pipe with a modification of the invention applied thereto.

Figure 2 is an enlarged fragmentary sectional view showing the hub and associated parts illustrated in Figure 1 but with the parts in a different position.

Figure 3 is a top plan view of a supporting cap or nipple disclosing a modified structure to that illustrated in Figures 1 and 2.

In constructing a joint embodying the invention, it is aimed to simplify the usual procedure of inserting a new joint whereby an entire new section of pipe including a hub must be used. The section of pipe is provided with external threads cast into, in addition to the internal threads having an elongated hub arranged on one end of said section. By means of a small threaded cap applied rigidly to the old pipe, the expense of a joint of pipe is avoided and the tearing out of decorated walls to replace said old pipe with a new long upper joint is made unnecessary in old buildings.

This invention allows the owners of houses to install new connections and fixtures with small expense where heretofore the expense and damage to walls was prohibiting. It is also intended to utilize the principle of a screw-jack to secure the results desired. This is done by mounting an exteriorly threaded cap on the lower end of a non-threaded pipe section and then screwing thereover an internally threaded hub or bell whereby a proper joint or connection is provided and in addition the upper sections of the soil pipe are properly supported and if desired may be raised.

Referring to the accompanying drawing by numerals, 1 and 2 indicate foreign partitions of a building through which the usual soil pipes 3 and 4 extend. These pipes are properly fitted into the building and it is usually rather difficult to remove the same and put new ones in place thereof so that whenever it is found necessary or desirable to provide a new joint of pipe between floorings to leave the pipes 3 and 4 in position and use some form of insertable joint. For instance, when it is desired to place a Y section 5 into a given pipe, it is necessary to remove one of the sections and to insert the section 5. As the sections below and above this section are rigidly held in position, it is necessary to provide some form of insertable joint as otherwise the upper pipes would have to be raised and then lowered which would be impractical.

According to the present invention an improved structure has been provided which presents an easily insertable joint. The section 6, forming part of the present invention, is of the usual construction at the lower end but the upper end is formed with a bell or hub 7 which is provided with internal threads 8 co-acting with the external threads of the cap or nipple 9. This cap or nipple is provided with an inwardly extending flange 10 adapted to project beneath the lower end of the pipe 4' so as to support said pipe and all pipes above the same. One or more set screws 11 may be used to hold the cap 9 in place until the parts are adjusted for permanent use as shown in Figure 1. The hub 7 is also preferably provided with an aperture 12 normally filled by plug 13, though if desired, an auxiliary vent pipe could be connected therewith.

In using a joint embodying the invention, the pipe 4' is left in position and temporarily supported by wires or other suitable means and the cap 9 secured thereto by the set screws 11. The hub 7 is then forced over the cap 9 and rotated until the parts assume the position shown in Figure 2 whereupon the lower end of the pipe 6 may readily fit into the upper hub of the section 5. The pipe 6 and hub 7 are then rotated in a reverse direction until the parts assume the position shown in Figure 1, after which a suitable packing or filling 14 is used, said packing or filling being of the usual kind now in common use. After this packing has been placed in position, the job is completed. If desired, instead of using cap 9 with the set screws 11, a cap 9' could be used which is divided into two parts and held together by clamping screws 15 whereby the cap is rigidly clamped to the section 4' without the use of the set screws.

What I claim is:—

1. An insertable joint for soil pipes, comprising a hub, a cap slidably mounted on the lower end section of said soil pipe having an annular shoulder adapted to engage and support said depending section of said soil pipe, and threads acting on said cap and said hub for supporting the cap and the soil pipe above the cap.

2. An insertable joint for soil pipes and the like comprising a hub having internal threads, and a cap having external threads, said cap having shoulders extending beneath and acting as a support for the soil pipes above the cap.

3. An insertable joint for soil pipes and the like comprising an internally threaded hub, an externally threaded cap fitting into said hub, said cap being provided with an inwardly extending flange acting as a support for the soil pipe above the cap, and means for clamping said cap to said soil pipe.

4. An insertable joint for soil pipes and the like comprising a section of pipe provided with a hub at one end formed with internal threads, and a cap having external threads engaging said internal threads, said cap being provided with a shoulder acting as a support for a soil pipe.

5. A joint for soil pipes comprising a section of pipe formed with a comparatively large internally threaded hub, an externally threaded cap formed with a supporting flange, said cap being adapted to be supported by the threads of said hub, and means for rigidly clamping said cap to a soil pipe section whereby it acts as a joint and a support for said section.

6. The combination with a soil pipe or the like, an insertable joint for connecting the branch fitting with the upper part of said soil pipe, said insertable joint comprising a pipe section adapted to fit into said branch fitting, and a hub internally threaded, an externally threaded cap rigidly secured to the lower end of the said upper part having a shoulder extending beneath the lower end of the upper part of said soil pipe, said cap acting as a support, and means as a filler arranged on top of said cap and between said hub and the lower end of said soil pipe.

7. A joint for soil pipes and the like comprising a section of pipe formed with an elongated internally threaded hub at one end, an externally threaded cap having an inwardly extending flange on which the soil pipe above said section may rest, means for rigidly clamping said cap to said soil pipe, said threaded cap engaging the threads of said hub, the uppermost end of the threads of said hub being sufficiently below the top of said hub to insure a proper gas or water tight joint, and a filler arranged in said hub between the soil pipe and the hub for producing a water and gas tight connection.

8. An insertable joint for soil pipes and the like, comprising a section of pipe having an internally threaded hub, an externally threaded tubular collar engaging the internally threaded hub, said collar adapted to surround the exterior of a pipe section terminating within said hub, said collar having one or more set screws for engagement with the exterior of said pipe within the hub.

9. An insertable joint for soil pipes and the like, comprising a section of pipe having an internally threaded hub, an externally threaded collar engaging the internally threaded hub, said collar formed so as to constitute an adjustable clamp around the exterior of a pipe terminating within said hub, said clamp being fitted with one or more set screws for contracting the clamp onto the said pipe section to support said pipe section.

10. An insertable joint for soil pipes, comprising a hub, a cap mounted on the lower end section of said soil pipe having an annular shoulder adapted to engage and support said depending section of said soil pipe, and threads acting on said cap and said hub for supporting the cap and the soil pipe above the cap.

11. An insertable joint for soil pipes and the like, comprising an internally threaded hub, an externally threaded cap fitting into said hub, said cap being provided with an inwardly extending flange acting as a support for the soil pipe above the cap, and means capable of causing pressure against the vertical exterior wall of said soil pipe and the vertical wall of said cap to hold the cap on said pipe when the hub is rotated upon said cap.

JOHN J. MEYER.